United States Patent [19]

de la Salle et al.

[11] Patent Number: 4,679,169

[45] Date of Patent: Jul. 7, 1987

[54] PRINTER HAMMER RESETTING CONTROL SYSTEM

[75] Inventors: Christian de la Salle, Evry; Guy D'Hervilly, Ris-Orangis, both of France

[73] Assignee: International Business Machines Corporation, Armonk, N.Y.

[21] Appl. No.: 587,755

[22] Filed: Mar. 9, 1984

[51] Int. Cl.$^4$ .............................................. G06F 3/12
[52] U.S. Cl. ................................. 364/900; 101/93; 364/519
[58] Field of Search ... 364/200 MS File, 900 MS File, 364/518, 519; 101/93, 93.01, 93.03, 93.29, 93.04, 93.09, 93.14, 93.18, 93.28, 93.23, 426

[56] References Cited

U.S. PATENT DOCUMENTS

| | | | |
|---|---|---|---|
| 3,862,372 | 1/1975 | Deutsch | 364/900 |
| 3,936,802 | 2/1976 | Champiau et al. | 101/93 |
| 4,048,625 | 9/1977 | Harris, Jr. et al. | 364/900 |
| 4,079,670 | 3/1978 | Severance | 364/900 |
| 4,361,092 | 11/1982 | Krakauer | 101/426 |
| 4,368,666 | 1/1983 | Kozawa et al. | 101/93.01 |
| 4,389,935 | 6/1983 | Arai | 101/93.01 |
| 4,495,597 | 1/1985 | Barthel et al. | 364/900 |

*Primary Examiner*—Eddie P. Chan
*Assistant Examiner*—Kevin A. Kriess

*Attorney, Agent, or Firm*—John S. Gasper

[57] ABSTRACT

A microprocessor provides to a main instruction source, A FIFO memory, various instructions (paper feed, hammer settings, ...) for a printer represented by instruction register thereof. For each instruction of the (A,C) type representing an operation code (C) for instance, a set command) for the hammer with address (A), address (A) is inputted into a secondary instruction source, a FIFO memory, simultaneously with a time information (Y) issued from a cyclic type binary counter. A so called mask bit (Z) which changes of value on every cycle, is also inputted, after complementation with time information (Y). When the contents (Y,Z) of counter and the contents (Y',$\bar{Z}$) available from the output of source, are identical, comparator indicates to control unit that address (A') available from the output of source corresponds to the address of an hammer to be reset. Control unit adds code (C=RESET) and provides instruction (A', RESET) to register. Control unit is also provided with various means for controlling the status of instruction sources and manages the priorities when contradictory instruction are received. The system allows the reset commands to be removed from microprocessor and the input/output devices thereof, which saves machine time. In addition, the number of instructions to be stored into source is almost halved.

4 Claims, 2 Drawing Figures

PRINTER HAMMER RESETTING CONTROL SYSTEM

This invention mainly relates to a system for controlling hammer resetting in a belt printer after the type command has been given and also, to an instruction programmable timing system.

In a conventional impact printer of the belt type, the belt carries the type blocks and is continuously moving between the hammers and paper. For each character to be printed, it is necessary to accurately compute the instant the hammer hits the belt and the instant it is reset, so that it remains applied on the belt for a determined period of time which is accurate but varies in accordance with the character selected on the belt. Therefore, the printers of this type require the provision of a quick operating computation and control device, for instance a microprocessor. The time interval between the instant a command is given for energizing a determined hammer and the instant said determined hammer effectively strikes the belt, is called the hammer flying time. The instant the hammer is fired, i.e., energized, is set time $t_{set}$. Further, the hammer must remain fired for a determined period of time before being reset. The instant the firing of the hammer is terminated, is reset time $t_{reset}$. The period of time elapsing between a hammer strike command and the command for resetting said hammer is the hammer cycle time. The microprocessor computes and stores all the possible compensations into a table. For instance, the hammer flying time depends very much on the ambient temperature and therefore, on the length of the time during which the printer is operating. $t_{set}$ and $t_{reset}$ must be as accurate as possible, which requires the use of a microprocessor.

The microprocessor computes the addresses of the hammers to be controlled in function of the character line to be printed. Then, according to the address and operating conditions, it computes corresponding times $t_{set}$ and $t_{reset}$ and writes them by bursts into a buffer memory from which they are fetched out for controlling the hammers.

This buffer memory is of the FIFO type (First in, First out). A first portion of said memory contains print instructions relating to paper feed, belt running, hammer setting and resetting, etc., which are 16-bits coded, for instance. Each of these instructions of the (A,C) type is obtained, in the present case, by concatenating an 8-bits field representing operation code C, with another 8-bits field representing the binary coding of addresses A of the hammers to be energized or to be reset. In another portion, the FIFO memory contains, in one-to-one correspondence with the first portion, the instants on which the various instructions are to be executed. This FIFO memory is called the MAIN FIFO memory since it is the MAIN INSTRUCTION SOURCE (SPI).

This conventional system shows some disadvantages since the microprocessor has to compute both times $t_{set}$ and $t_{reset}$ and to provide the appropriate commands. But time $t_{reset}$ can be directly deduced from $t_{set}$ and does not depend on the intermediate variations of the printer speeds and temperatures. It would be better to determine $t_{reset}$ on real time $t_{set}$. This means that the clocks controlling the set and reset commands have to be able to be disconnected.

In fact, the set commands are adjusted by a signal the regularity of which is affected by physical parameters relating to the moment during which typing is performed.

On the contrary, the reset commands must be deduced through a strict delay from the time the corresponding type command is sent. Therefore, it should not be affected by any variations appearing between the set and reset commands.

In order to resolve this problem, an approach of the Applicant consists in discharging the microprocessor from this task and in synchronizing the hammer reset and set times by using a physical delay line. In this case, the addresses of the hammers to be reset would be entered into such a delay line and available only after an appropriate delay.

However, the use of a physical delay line is incompatible with the requirement of establishing a priority among the instructions issued from said delay line which are mainly hammer reset instructions issued from a so called SECONDARY INSTRUCTION SOURCE (SSI) source to be described later and from the MAIN FIFO memory, i.e., as seen above, all the other instructions relating to the paper, the belt, the hammer energization, etc...

In effect, two types of asynchronous instructions must be delivered to a single instruction register of the printer to be decoded and executed therein. It may happen that two different instructions, for instance a hammer set instruction M and a hammer reset instruction M', are simultaneously provided to the instruction register, which is, of course, unacceptable. Thus, in this first solution, the absence of any device for managing priorities (unless a giant buffer circuit is provided) shows that the use of such a delay line is impossible.

In addition, it is possible to consider the use of a set of shift registers controlled by a same clock and therefore, able to be synchronized. In such a case, it would be possible to manage the priorities but at high cost. The major disadvantage of this solution further lies in the fact that such a set would require a very important silicon surface to be integrated therein, and at last, the power consumption would be very high.

Therefore, the principle of this invention consists in discharging the microprocessor and the input/output devices thereof, from delivering the reset commands, in order to save machine time as well as some work load of said input/output devices through some saving gained in sending reset commands through the microprocessor input/output lines. In practice, this invention allows the number of instructions to be stored into the main instruction source, to be halved. This problem could have been program-solved but it is known that a device wired on a silicon surface provides a considerable gain in flexibility and quickness.

This invention is based on the following considerations:

(a) the cycle time is the same for all the hammers. It should be programmable when applying power to the equipment;

(b) reset time $t_{reset}$ is synchronized with effective set time $t_{set}$ which is affected by the machine variations. On the contrary, when the hammer is energized, its reset time does not depend any longer on the subsequent variations and must be very accurate;

(c) therefore, it can be independent of the belt movement;

(d) however, this high accuracy only relates to the time scale used for the hammers, said time scale being rougher than the "ELECTRONIC" time scale used by the system for generating the reset commands. Consequently, a certain flexibility is ensured and thus, allows the priorities to be managed between the printer hammer set and reset commands;

(e) further, with such an arrangement, it is not necessary to store the operation codes corresponding to the addresses of the hammers to be reset since code C is implicitly C=RESET.

Rejecting the solutions of the Prior Art for the above indicated reasons, the Applicant has resolved the problem as indicated in claim 1. The Applicant has designed a belt printer hammer resetting control system which can be easily integrated into silicon.

As known by the person skilled in the Art, a computing element loads a main instruction source (SPI) with instructions of types A (Address), C (operation code) which relate to the printer and which have been previously elaborated by said computing element.

From there, the system of this invention:

takes the instructions relating to hammer resetting in charge without any intervention of the computing element. It applies a programmable determined delay thereto by synchronizing the reset time with the effective set time. At last, it controls the various accesses to the printer represented by the instruction register thereof, according to pre-established priority rules.

Therefore, the system of this invention includes:

cyclic type binary counting means which permanently provide on the one hand, a time information (Y) taking the same value on every cycle and on the other hand, a mask information (Z) changing of value on every cycle.

storing means of the FIFO type forming a secondary instruction source (SSI) for simultaneously storing a binary word (Y, $\overline{Z}$) and address A of the hammer to be reset corresponding thereto.

comparing means for permanently comparing the binary word (Y', Z') available from the SSI output and the binary word (Y, Z) available from the output of the counting means and which output a signal at a determined level when the two words are identical, control and monitoring means receiving: the comparing means output, the output relating to the instruction codes contained in the main instruction source (SPI), the output relating to the addresses contained in the secondary instruction source which control printer access by managing the priorities between the instructions (A, C) provided by the main instruction source and the instructions (A', implicit RESET) provided by the secondary instruction source when said instructions (A', implicit RESET) are recognized as available by said determined level signal.

In a preferred embodiment, said storage means are comprised of a FIFO random access memory (RAM). Such a memory allows a storing operation to be almost immediately executed in the first free position.

Figure 1:
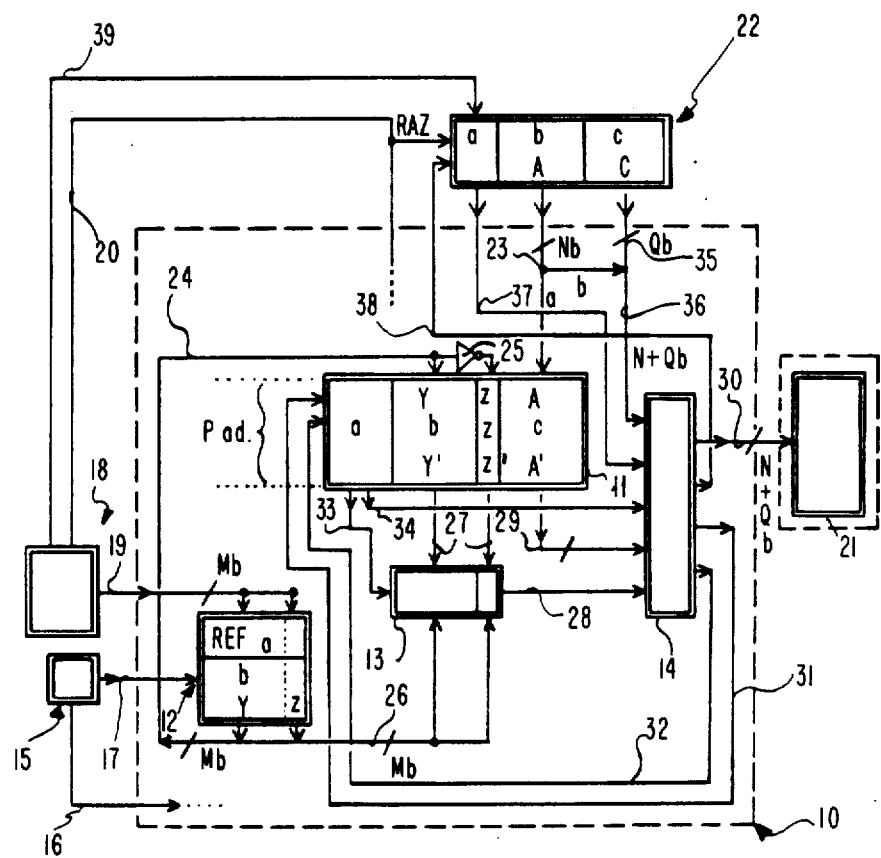
FIG. 1 shows the general arrangement of the control system of this invention.

The control system is shown in dashed lines as block 10 in FIG. 1. It mainly comprises: a FIFO RAM access memory (RAM) 11 (FIFO=FIRST IN, FIRST OUT) which is the secondary instruction source (SSI) the P×R bits capacity of which depends on the printer in use, a M-bits programmable cyclic counter 12, a M-bits logic comparing circuit 13 and a logic circuit 14 which operates as a printer access controller (CAI).

Various peripheral devices not included in the invention but useful for a good understanding thereof, are also shown outside system 10.

First of all, an oscillator 15 provides clock signals to device 10 through lines 16 and 17.

A first signal (line 16) is, in fact, the general clock signal of system 10 considered as synchronous. This means that all the devices of system 10 are intersynchronized by said clock whose PERIOD, which is the time elapsing between two successive pulses, constitutes the time unit of all the device. Any other duration ensuring a function in the operation of the device, is necessarily an whole multiple of this period. In addition, each of the possible commands relating to a certain period, is generated within an element (called a source element) which is either inside or outside system 10, then taken into account in a so called addressed element during the following period at the earliest, but never during the same period.

Said PERIOD of device 10 can be, for instance, of about one microsecond.

The second signal on line 17 is applied to and controls programmable counter 12 in the decrementing sense and is called TIC.

Therefore, the pulse controlling the decrementation of counter 12b is called TIC. The time interval between two successive pulses TIC defines the granularity of the system internal clock. During this interval, it is always possible to set (or to reset) a hammer without any detrimental effect on the printing quality. This can represent from 1 to 20 times the device period.

Therefore, counter 12b does not decrement on each period but only on each of the periods during which a pulse is present on line 17, i.e., on each pulse TIC.

Then, a control element 18, for instance a microprocessor, provides a binary word of M bits to system 10 through bus 19, said M-bits binary word being transmitted in parallel to portion REF 12a of counter 12 for characterizing the rotation thereof. The time taken by counter 12 for a complete revolution is called a CYCLE. One of the M bits called bit Z will allow two successive cycles to be differentiated.

In addition, computing element 18 provides a signal RAZ (General reset to zero) to all the machine elements, through bus 20.

The printer is shown by its instruction register 21.

A last, main instruction source SPI is referenced in 22. It was seen above that source SPI receives instructions from microprocessor 18, which have previously been elaborated therein as words of the (A, C) type in which A represents an hammer address and C, an operation code (hammer set, reset, etc. . . . ). It is to be noted that certain operation codes are not provided with an address (paper feed, belt control . . . ). Source SPI 22 is a FIFO random access memory. The peripheral elements and in particular computing element 18 and source SPI 22, receive a clock signal following the variations of the mechanical parameters (the machine operating temperature for instance) according to the above indicated principle.

Portion REF 12a allows programmable counter 12 to be programmed.

In fact, this counter normally operates according to a principle of "cyclic" decrementation, i.e., it is decremented by 1 on each pulse TIC, from its maximum value. For instance, in the case of a counter in which M=4 bits, it is decremented from 1111 to 0000 by 16 pulses TIC, through successive decrementing steps and goes up again to its maximum value of 1111 on the following pulse TIC by beginning the next revolution according to the principle of an endless rotation.

But microprocessor 18 can force an intermediate value, for instance 1001, through bus 19 by means of input REF, which represents only 10 clock steps or pulses TIC to go back to 0000. Each time, the counter is set to 0000, it does not go through 1111 any longer but comes back to intermediate value 1001 and keeps decrementing from this value. Therefore, the microprocessor can control the duration of each revolution of the counter through the value introduced thereby into portion REF 12a.

Thus, a complete revolution is called a CYCLE. In practice, a CYCLE represents the time which must elapse between the hammer set command and same hammer reset command and it was seen in the foregoing that it is possible to set this duration to a fixed value for all the hammers of a given printer. A current duration of this CYCLE is of a few milliseconds. Therefore, in principle, the microprocessor will load the same value into portion REF once for all. Nevertheless, this possibility of using programs of different durations, is an interesting secondary feature of the invention since it allows system 10, after being integrated into a silicon chip, to be adapted to different printers, even to printers of different types and designs.

Counter 12 is so designed that it provides two binary information. The first one is called Y and represents a time information which takes the same value on every CYCLE and changes of value on every clock signal TIC. The second one is a mask information comprised of above indicated bit Z which changes of value on every CYCLE.

The M-bits counter can provide both information Y and Z in the same time. It is sufficient to consider that Z is the most significant bit of the M bits or stated another way, that the binary words (Y,Z) appear in counter 12 in an inverted binary notation.

The first time counter 12 is loaded (when starting the machine), the same value is simultaneously stored:

REF.=Y(MAX)

into 12a and 12b with, in addition, the "0" value into bit Z of 12b. From this time, counter 12b is decremented on every signal TIC until it goes down to zero. On the next pulse TIC following this setting to zero, value REF of 12a is loaded into Y of 12b while $\bar{Z}$ is substituted for Z, then Y keeps on decrementing down to zero, etc. in an endless series of so called rotating decrementations where Y takes the same value on every cycle but where Z is inverted on every cycle and therefore (Y,Z) takes the same value every two cycles.

For instance, assume that it is desired that CYCLE=4 pulses TIC. It is possible to use a counter with M=4 bits=3+1 bits by loading value 3 into REF and by loading the Z value initialized on every cycle. The evolution of the counter contents in inverted binary notation is as follows:

| LSB | Y V | | Z V | MSB | |
|---|---|---|---|---|---|
| 1 | 1 | 0 | 0 | | 1st CYCLE |
| 0 | 1 | 0 | 0 | | |
| 1 | 0 | 0 | 0 | | |
| 0 | 0 | 0 | 0 | | |
| 1 | 1 | 0 | 1 | | 2nd CYCLE |
| 0 | 1 | 0 | 1 | | |
| 1 | 0 | 0 | 1 | | |
| 0 | 0 | 0 | 1 | | |

The operating principle of system 10 can be understood as follows.

Each time source SPI 22 controls an hammer set, for instance the one of address A which is contained in portion 22b, this address is transferred as a binary word of N bits through bus 23a, into R.H. portion 11c of source SSI 11, to be stored therein. It is unnecessary to record an operation code with this address since this code is necessarily C=RESET. In the same time, contents 12b of counter 12, i.e., a binary word (Y, Z) of M bits, is stored, after transfer through bus 24 and complementation of bit Z through inverter 25, into portion b+z of source SSI 11, therefore in the (Y, $\bar{Z}$) form. Word (Y, $\bar{Z}$, A) is stored into source SSI 11 under the control of CAI 14 through control wires as this will be described later.

It should be noted that if the contents of counter 12b is in fact, transferred to source SSI 11 through bus 24 on every hammer set, it is also permanently applied to comparator 13 through bus 26 in its normal condition (Y,Z).

Thus, for each busy line, among P possible lines of source SSI, corresponding values Y and $\bar{Z}$ of the contents of counter 12b are associated to each binary address of an hammer, for instance A. Y represents both the "elapsed" time which is in said counter 12b when hammer A is set and the "future" time which is there again when same hammer A is reset, but one CYCLE later (due to bit Z since the value of bit Z is changed on each revolution of the counter).

Said bit Z is therefore the CYCLE differentiating bit. At last, each line of source SSI 11 contains an information of the (Y, $\bar{Z}$, A) type.

According to the contents of source SSI 11, binary word (Y, $\bar{Z}$, A) is more or less quickly outputted, i.e., in position (Y', $\bar{Z}$', A'). This output permanently feeds comparator 13 by means of bus 27 with time portion (Y',$\bar{Z}$') thereof.

Thus, each time the time displayed by counter 12b on the present cycle, namely (Y,Z), is equal to the elapsed time (stored during the preceding cycle), namely (Y',$\bar{Z}$'), the comparator receives two identical binary words Y'=Y and $\bar{Z}$'=Z. Then the comparator provides a signal of the appropriate level on line 28, to CAI 14 which partly operates as a logic gate. When receiving this signal, CAI 14 opens and lets address A' of SSI 11 available on bus 29 to be transferred towards the printer (represented in fact by instruction register 21 thereof) through bus 30. It should be also understood that CAI 14 automatically gives the C=RESET operation code back thereto. In fact, CAI 14 has a function more sophisticated than a common gate. It is really a true communication controller which entirely monitors and controls sources SPI and SSI and in particular, it manages the access conflicts relating to printer 21 when both instruction sources, i.e., SPI 22 (main source) and SSI 11 (secondary source) have an available instruction to be transferred to the printer in function of a priority scheme designed and wires once and for all. The function of CAI 14 will be described in details in the following.

Source SSI 11 which is, as indicated above, a FIFO random access memory receives and transmits two types of information:

- it permanently receives data of the above-indicated (Y,Z,A) type, through buses 23a and 24,
- it permanently transmits data of the same (Y',Z',A') type through buses 27+29,
- it receives two pulsed and time-calibrated commands through wires 31 (the so-called load pulse) and 32 (the so-called unload pulse),
- at last, it transmits two condition indicators: "EMPTY" on wire 33 and "FULL" on wire 34. It is to be noted that comparator 13 is inhibited through wire 33 when source SSI 11 is empty.

In addition, the M+N bits-input data word (Y,Z,A) is effectively stored into source SSI 11 (i.e., introduced in the FIFO) only during the load pulse provided through wire 31 and it must absolutely remain stable for this time. Nothing can enter source SSI as long as wire 31 is inactive (at 0). In the same way, output data word (Y',Z'A') remains the same as long as control wire 32 (unload) remains at 0 (at rest). On the contrary, as soon as wire 32 is set to the 1 level when an unload pulse is provided by CAI 14, output word (Y'Z',A') is lost since it instantaneously crushed by the word immediately following said output word in the FIFO, for instance (Y", Z",A") while an additional place becomes available in the "high" portion of the FIFO. Two extreme cases can be considered:

- on loading, if at a given time, P-1 locations in the FIFO are already occupied, after additional loading, all the P locations available in the FIFO are then occupied and output wire 34 (FULL) goes to 1, which indicates that source SSI 11 is no longer able to receive any additional information (at least as long as the output information is not unloaded, i.e., crushed by the next following information). In any other case, wire 34 remains permanently at zero.
- on unloading, if at a given time, only one location is occupied in source SSI 11, after unloading the FIFO will be empty and then, wire 33 (EMPTY) will be set to 1, which indicates that source SSI 11 is no longer able to transmit any valid information on output buses 27 and 29 (i.e., having a logic meaning). In any other case, wire 33 remains permanently set to zero.
- at last, the following configuration

FULL (34)=1=EMPTY (33)

is physically impossible since it has no logic meaning.

Source SPI 22 is also a FIFO random access memory.

An electronic information which is stable or not, is always provided at the SPI 22 output, i.e., through buses 23 and 35 (or 36). As long as the level of output line 37 (VALID) remains at 1, said information is undoubtedly stable and valid. It is only when said line 37 is at level 1 that the N+Q bits information of bus 36 (which comprises buses 23 and 35) can be considered as a main instruction which is not only stable but also provided to be sent to printer 21 as soon as possible. At last, when input line 38 is set to level 1, source SPI 22 is commanded to switch over to the next instruction, which causes the present instruction to get lost, for instance (A,C), and its replacement or more exactly its "crushing" by the next instruction, for instance (A$^1$,C$^1$). When line 38 is at level 0, source SPI 22 determines that its data have not been used (for instance because source SSI 11 is full, which is indicated by wire 34). For all the transitions and in reason of the resulting fluctuation of the levels on output lines 36: 23+35, status line 37 (VALID) can only remain at 0. Further, even when the bus becomes stable again, said line 37 (VALID) can remain at 0 and be set to 1 only later on, for instance, at a later instant determined by microprocessor 18 as being the instant from which printer 21 can begin to carry out instruction (A$^1$,C$^1$) which is then available. This command is transmitted to source SPI 22 through line 39. In fact, it is to be recalled that line 37 (VALID) when set to 1, ensures not only the electronic stability of output bus 36, but also indicates that source SPI 22 is going to send as soon as possible the instruction coded therein, to printer 21 where said instruction is to be executed. FIFO random access memories which can be used for implementing the main and secondary instruction sources, are described in the following paper:

"Organized RAMs as FIFO Buffers with an LSI Controller Chip" by J. Seltzer, Electronic Design, Sept. 30, 1981, pages 209-216.

The specification is to be now completed by a detailed description of the operation of Printer Access Controller CAI 14 which is the vital portion of system 10 since, stimulated by the condition of main and secondary instruction sources 22 and 11, it reacts thereon by managing all their request for accessing printer 21 in function of priority rules established once and for all.

It receives and transmits the following information:

- through N+Q bits bus 36, CAI 14 is permanently provided with an instruction (A,C) issued from source SPI 22,
- through control line 37 (VALID), CAI 14 is provided memory as to the validity of the preceding instruction, according to the line level:
  - if the line is at the 0 level, this means that the electronic information available on bus 36 has no meaning and that it can even fluctuate,
  - if on the contrary, the line is at the 1 level, the electronic information available on bus 36 is not only stable, but is a real instruction to be provided as soon as possible, to printer 21.

Through bus 29, CAI 14 is permanently provided with a N-bits address A' issued from source SSI 11.

Through control line 28, CAI 14 is provided with a validity "memory" for the preceding address, namely the result of the following comparison: (Y,Z)=(Y',Z'):

- if control line 28 is at the "0" level, this means that bus 29 carries an electronic information with no meaning and which can even fluctuate,
- if, on the contrary, control line 28 is at the "1" level, then not only bus 29 remains permanently stable, but in addition, it represents true address A' of a hammer to be reset in printer 21.

At last, line 34 (FULL) in active condition (at the "1" level) carries an additional control information provided to freeze any SET instruction issued from source SPI 22 because it is, then, impossible to introduce any new information in the FIFO of source SSI 11 since said source SSI 11 is full.

At last, CAI 14 produces the signals available on lines 31, 32 and 38 the functions of which have been described above.

As to its principle of operation, CAI 14 is essentially a multiplexer further provided with control and monitoring functions in case that priority conflicts are to be managed. A person skilled in the art is quite able to provide such a device.

It is obvious that CAI 14 can be wired for any other priority scheme, even for the most sophisticated one, and in function of any operation code C chosen with any number of bits Q, without departing from the scope of this invention.

Figure 2:
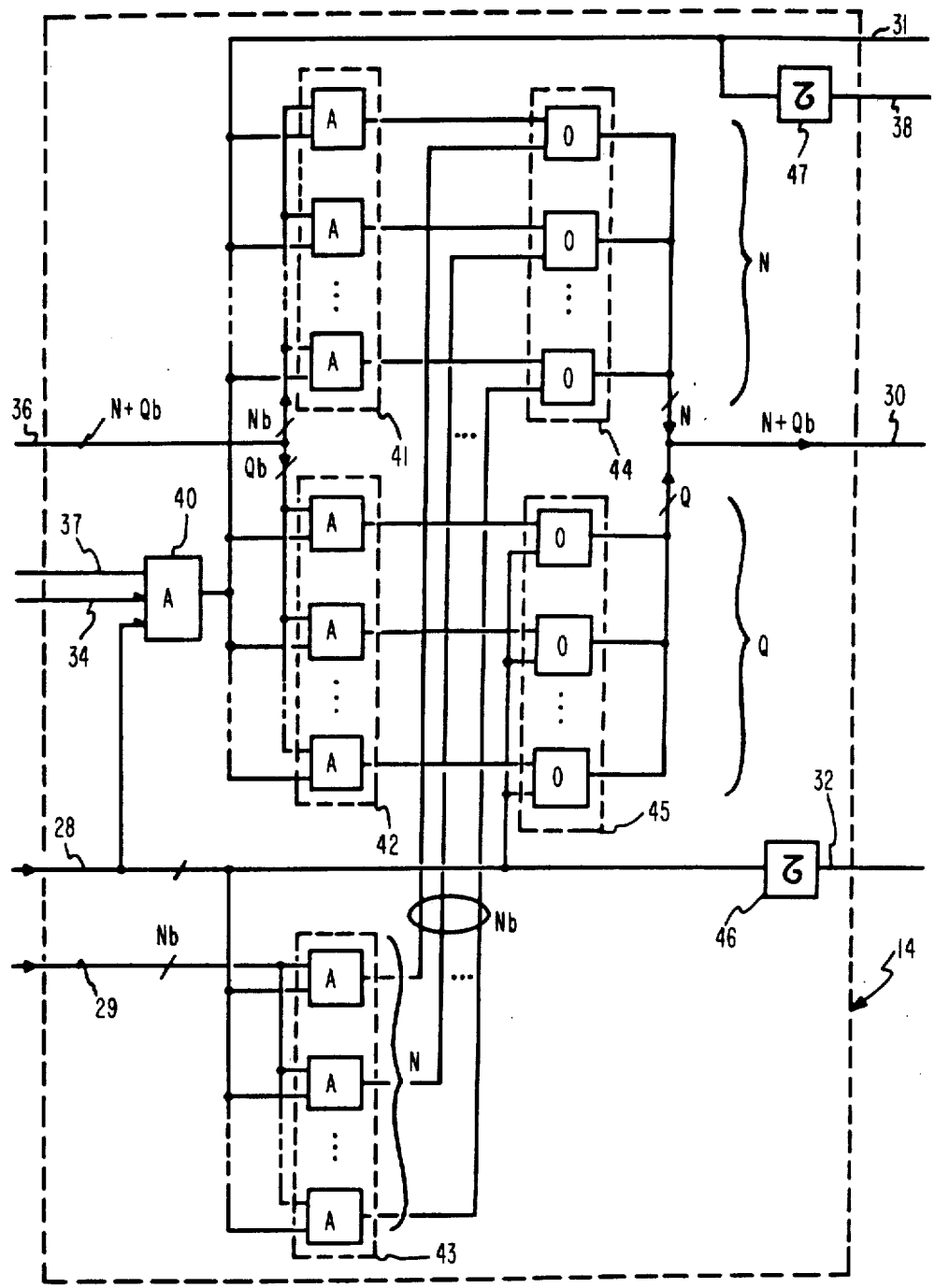
FIG. 2 shows a particular embodiment of said printer access control and monitoring means.

However, FIG. 2 shows an embodiment directly illustrating what is said above while assuming the following as to the definition of the N+Q bits available on bus 30:

When all the Q bits corresponding to operation code C are at the "1" level, this means that C=RESET and when all these Q bits are at the "0" level, this means that line 30 is inactive. In addition, it is considered that a RESET command has priority over the other commands.

AND circuit 40 (it is to be noted that the signals provided by lines 28 and 34 are inverted before driving this circuit), acts as a priority manager since it is connected to status lines 34 and 37 of sources SSI and SPI and to the output of comparator 13 through line 28.

For instance, let us assume that line 28 is at the "1" level, i.e., the N bits of address A' are available from the output of source SSI 11 through bus 29 (FIG. 1). A logic "0" is outputted by circuit 40 (which therefore, in both cases, is independent of the status of sources SSI and SPI) and consequently, a logic "0" is outputted by the N AND gates 41 and the Q AND gates 42.

In another connection, the "1" level of line 28 is also applied to the N AND gates 43 also receiving the N bits of address A'. Therefore, address A' is reproduced at the output of these gates and its bits are applied to each of the N OR gates 44 one terminal of which is maintained to potential 0. Therefore, the bits of address A' appear on bus 30.

In the same time, each of the Q OR gates 45 one input of which is maintained at 0, receives through its second input, a logic "1" issued from line 28. Therefore, a logic "1" is outputted by each of these gates.

Then (A', 111 ... 1) or in other words, instruction (A', RESET), appears on bus 30.

Blocks 46 and 47 are comprised of circuits which apply the necessary delay allowing the time required for carrying out these operations to be taken into account.

In fact, CAI 14 decodes each operation code C of source SPI to determine whether C=SET. If yes, it tests source SSI 11 to determine whether it can store address A. It can also directly transfer certain instructions (as paper feed, belt drive, etc. . . ) from bus 36 to bus 30, to be executed in register 21.

It is to be understood that several main instructions (A,C) can have a theoretical objective of simultaneity, i.e., it can be desired to have said instructions to be simultaneously executed in parallel, at the level of their execution in printer 21, while being in fact, successively emitted in time, i.e., one by one, in series, at the level of any one of the two instruction sources 22 and 11. In fact, these instructions mainly relate to MECHANICAL phenomenons which, as fast as they can be, will always remain "infinitely slow" relatively to the electronic speeds and more particularly, relatively to the above indicated period of about one microsecond. Then, a certain number of hammer SET instructions (about 12 to 24) can be sent to printer 21, one after the other, at a rate of one per period, provided that they relate to different hammers, while all the related hammers always appear as being energized on the same "mechanical" instant, i.e., "simultaneously". Therefore, it is to be kept in mind that several different hammers can also be reset on the same "mechanical" instant indicated by the same value read on counter 12b while, however, said resettings are executed during different successive periods (and they can even be in conflict due to the asynchronism of these events).

In a particular embodiment in which the priority between sources SPI and SSI is not to be managed, CAI 14 can be an ordinary logic gate, and then, the system of the invention would operate as an instruction A programmable timing system.

In fact, it has been shown that the major function of counter 12 consists in delaying an instruction as A, which has been previously stored into source SSI 11, by a constant time defined once and for all by the value displayed in counter portion REF. 12a, as seen above. This is made possible by the particular function ensured by masking bit Z. Without said bit Z, available instruction A is immediately outputted by source SSI when said source SSI is empty. If it is assumed that CAI 14 consists only in an ordinary logic gate, Y=Y' applied to compare circuit 13 causes this gate to open and instruction A can be immediately used.

Thus, the combination of counter 12, source SSI 11, compare circuit 13 and logic gate 14, provides by itself, a predetermined duration programmable timing system of great interest and open to multiple embodiments. It is by adding additional priority monitor and managing functions to this main function of logic gate, that CAI 14 is obtained, i.e., a more sophisticated system which can be more particularly applied for controlling hammer resetting in a belt printer as indicated in the foregoing.

In the last case, the major function of counter 12 consists, therefore, in delaying resettings with respect to hammer sets, by a CONSTANT time defined by value REF once and for all. This value is stored into portion 12a and is synchronized with the corresponding set command.

In addition, this remains true whatever the status of source SSI can be on the set time.

We claim:

1. A microprocessor-controlled printer hammer resetting control system characterized in that it includes:
   first storing means which can be loaded from the microprocessor with hammer operation codes including a hammer SET code and an address value of the hammer to be controlled,
   said first storing means providing a first status signal when loaded with said hammer SET code and said address value,
   binary counting means of the cyclic type for repeatedly counting a predetermined number of timing pulses representing the elapsed time of a hammer operating cycle and which permanently provides a binary count output comprising time information (Y) indicating the instantaneous cycle count of said counting means and mask information (Z) indicating the count cycle of said counting means, said mask information changing in value on every cycle, second storing means which can be loaded simultaneously with a binary count corresponding with said elasped time of said hammer operating cycle and with said address value loaded into said first storing means, said binary count being derived from said binary count output of said counting means and comprising said time information and the complement of said mask information of said binary count output, said second storing means providing a second status signal when loaded with said binary count and said address value, comparing means connected to said binary counting means and said second storing means for permanently comparing said binary count stored in said second storing means and said binary count output of said counting means, said comparing means being operative to produce a control signal having a first level when said binary count and said binary count output are different, and a second level when said binary count and said binary count output are identical, and control and monitoring means connected for receiving: said control signal from said comparing means, said hammer SET code said first status signal and said address value from said first storing means, and said address value and said second status signal from said second storing means, said control and monitoring means being operable in response to said first status signal from said first storing means and said first level control signal from said comparing means for (1) transmitting said hammer SET code and said address value of said first storing means to said hammer to be controlled, and (2) loading into said second storing means said binary count derived from said counting means and said address value in said first storing means, and then transmitting a hammer RESET code and said address value of said second storing means to said hammer to be controlled in response to said second status signal from said second storing means and said second level signal from said comparing means, said hammer RESET code being derived by said control and monitoring means from said second level signal of said comparing means.

2. A control system as set forth in claim 1 or characterized in that said binary counting means includes a portion settable for counting different numbers of timing pulses between 0 and the maximum value permitted by said counting means, whereby said counting means is operable so as to be cyclically rotated on a sub multiple of said maximum value.

3. A control system as set forth in claim 2 characterized in that time (Y) and mask (Z) information are writted into said counting means according to an inverted binary notation, said mask information (Z) being the MSB thereof.

4. A control system as set forth in claim 1 in which said binary counting means is programmable for altering the number of timing pulses counted by said counting means whereby said operating cycle is selectively varied.

* * * * *